United States Patent Office 3,133,930
Patented May 19, 1964

3,133,930
ESTER AND AMIDE DERIVATIVES OF THIENO-
[3,2-b]INDOLE 3-CARBOXYLIC ACIDS
Lincoln Harvey Werner, Summit, N.J., assignor to Ciba
Corporation, a corporation of Delaware
No Drawing. Filed Aug. 15, 1961, Ser. No. 131,472
14 Claims. (Cl. 260—293.4)

The present invention concerns lower alkyl esters, unsubstituted amides or N-alkyl-substituted amides of thieno[3,2-b]indole 3-carboxylic acids. More especially, it relates to compounds of the formula

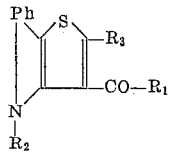

in which Ph stands for a 1,2-phenylene (or o-phenylene) radical, $R_1$ represents lower alkoxy, amino, N-lower alkyl-amino or N,N-di-lower alkyl-amino, $R_2$ stands for tertiary amino-lower alkyl, in which tertiary amino is separated from the indole nitrogen atom by at least two carbon atoms of the lower alkyl group, and $R_3$ represents hydrogen or an aliphatic radical, salts, quaternary ammonium compounds, N-oxide or salts of N-oxides thereof, as well as process for the preparation of such compounds.

The 1,2-phenylene (o-phenylene) radical may be unsubstituted or may be substituted by one or more than one of the same or of different substituents attached to any of the four positions available for substitution. Substituents are, for example, lower alkyl, e.g. methyl, ethyl, n-propyl, isopropyl and the like, hydroxyl, etherified hydroxyl such as lower alkoxy, e.g. methoxy, ethoxy, n-propyloxy, isopropyloxy and the like, esterified hydroxyl, such as halogeno (representing hydroxyl esterified by a hydrohalic acid), e.g. fluoro, chloro, bromo and the like, nitro, amino, such as N,N-di-lower alkyl-amino, e.g. N,N-dimethylamino, N,N-diethyl-amino and the like, trifluoromethyl, or any other suitable substituent. The 1,2-phenylene group Ph in the above formula stands, therefore, for 1,2-phenylene, lower alkyl-1,2-phenylene, hydroxy-1,2-phenylene, etherified hydroxy-1,2-phenylene, such as lower alkoxy-12-phenylene and the like, esterified hydroxy-1,2-phenylene, such as halogeno-1,2-phenylene and the like, nitro-1,2-phenylene, amino-1,2-phenylene, such as N,N-di-lower alkyl-amino-1,2-phenylene and the like, trifluoromethyl-1,2-phenylene or any other, suitably substituted 1,2-phenylene group.

The group $R_1$ in the above formula may represent amino of the formula —$NR_aR_b$, in which each of the groups $R_a$ and $R_b$ stands for hydrogen or lower alkyl, having preferably from one to four carbon atoms, e.g. methyl, ethyl, n-propyl, isopropyl, n-butyl and the like. $R_1$ may also represent lower alkoxy, having preferably from one to four carbon atoms, e.g. methoxy, ethoxy, n-propyloxy, isopropyloxy, n-butyloxy, isobutyloxy, secondary butyloxy or tertiary butyloxy, or any other, suitable lower alkoxy group.

The group $R_2$, attached to the nitrogen atom of the indole portion of the molecule, stands for tertiary amino-lower alkyl and may be represented, for example, by the formula —$(C_nH_{2n})$—Am, in which the letter $n$ is a whole number from 2 to 7, whereby the group of the formula —$(C_nH_{2n})$— separates the group Am from the indole-nitrogen atom by at least two carbon atoms, and Am stands for a tertiary amino group.

The group —$(C_nH_{2n})$— in the above formula, in which $n$ stands for a whole number from 2 to 7, therefore, represents an alkylene radical having from two to seven carbon atoms, which separates the tertiary amino group, e.g. the group Am, from the indole-nitrogen atom by at least two carbon atoms. Such alkylene radical may have a straight or branched carbon chain, and stand for 1,2-ethylene, 1-methyl-1,2-ethylene, 2-methyl-1,2-ethylene, 1,3-propylene, 1,3-butylene, 2,3-butylene 3,4-butylene, 1,4-butylene, 1,4-penylene, 1,5-pentylene, 1,5-hexylene, 1,6-hexylene 1,7-heptylene and the like.

The tertiary amino group, such as the group Am in the above formula, is represented, for example, by N,N-substituted amino, in which each of the substituents is represented, for example, by lower alkyl, lower alkenyl, cycloalkyl, cycloalkyl-lower alkyl, monocyclic carbocyclic aryl, monocyclic carbocyclic aryl-lower alkyl and the like. Such substituents have from one to ten carbon atoms, and may stand, for exampe, for lower alkyl, e.g. methyl, ethyl, propyl, isopropyl, butyl, isobutyl, secondary butyl, pentyl, neopentyl and the like, lower alkenyl, e.g. allyl, 2-methylallyl and the like, cycloalkyl, e.g. cyclopentyl, cyclohexyl and the like, cycloalkyl-lower akyl, e.g. cyclopentylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like. N,N-di-substituted amino groups are, for example, N,N-di-lower alkyl-amino, in which lower alkyl has from one to four carbon atoms, e.g. N,N-dimethylamino, N-methyl-N-ethylamino, N,N-diethylamino, N,N-di-n-propylamino, N,N-di-isopropylamino and the like, N-cycloalkyl-N-lower alkyl-amino, in which cycloalkyl has from three to seven ring carbon atoms, and lower alkyl has from one to four carbon atoms, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, in which lower alkyl has from one to four carbon atoms, e.g. N-benzyl-N-methyl-amino, N-benzyl-N-ethyl-amino, N-methyl-N-(1-phenylethyl)-amino, N-methyl-N-(2-phenylethyl)-amino and the like, or any other equivalent N,N-di-substituted amino group. The substituents, particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable group. N,N-di-substituted amino groups of this type are, for example, N-hydroxy-lower alkyl-N-lower alkyl-amino, e.g. N-(2-hydroxyethyl)-N-methyl-amino and the like, N,N-di-hydroxy lower alkyl-amino, e.g. N,N-di-(2-hydroxyethyl)-amino and the like.

The tertiary amino group, e.g. the group Am in the above formula, may also be represented by 1-N,N-alkylene-imino or by 1-N,N-aza-alkylene-imino groups, in which alkylene has from four to six carbon atoms, as well as by 1-N,N-oxa-alkylene-imino or by 1-N,N-thia-alkylene-imino, in which alkylene has preferably four carbon atoms. Together with the nitrogen atom, such alkylene, aza-alkylene, oxa-alkylene or thia-alkylene radicals represent, for example, 1-N,N-alkylene-imino, in which alkylene has from four to six carbon atoms, such as 1-pyrrolidino radicals, e.g. 1-pyrrolidino, 2-methyl-1-pyrrolidino and the like, 1-piperidino radicals, e.g. 1-piperidino, 2-methyl-1-piperidino, 4-methyl-1-piperidino, 3-hydroxy-1-piperidino, 3-acetoxy-1-piperidino, 3-hydroxymethyl1-piperidino and the like, 1-N,N-(1,6-hexylene)-imino, 1-N,N-(1,7-heptylene)-imino and the like, 1-N,N-(aza-alkylene)-imino, particularly 1-N,N-(N-lower alkyl-aza-alkylene)-imino, in which alkylene has from four to six carbon atoms, such as 1-N,N-(3-aza-1,5-pentylene)-imino, particularly 1-N,N-(3-aza-3-lower alkyl-1,5-pentylene)-imino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza- 3-methyl-1,6-hexylene)imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 1-N,N-(3-oxa-1,5-pentylene)-imino, e.g. 4-morpholino and the like, 1-N,N-(3-thia-1,5-pentylene)-imino, e.g. 4-thiamorpholino and the like, or any other equivalent tertiary amino group.

A tertiary amino-lower alkyl substituent may also be represented by a heterocyclic or a heterocyclic-lower alkyl radical, in which the tertiary amino group is part of a heterocyclic nucleus. Such heterocyclic nucleus may be connected through one of its ring carbon atoms or through a lower alkylene radical, e.g. methylene, 1,2-ethylene and the like, with the indole-nitrogen atom; such groups are represented, for example, by 1-methyl-3-pyrrolodylmethyl, 1-methyl-3-piperidylmethyl, 1-methyl-4-piperidyl and the like.

The group $R_3$ represents hydrogen or an aliphatic radical, particularly lower alkyl, e.g. methyl, ethyl, n-propyl, isopropyl, n-butyl and the like, or any other suitable aliphatic radical.

Salts of the compounds of this invention are primarily pharmacologically and therapeutically acceptable, non-toxic acid addition salts with inorganic or organic acids, for example, mineral acids, e.g. hydrochloric, hydrobromic, sulfuric, phosphoric acids and the like, organic carboxylic acids, e.g. formic, acetic, propionic, pivalic, glycolic, lactic, malonic, succinic, maleic, malic, tartaric, citric, benzoic, cinnamic, mandelic, salicylic, 4-aminosalicylic, 2-phenoxy-benzoic, 2-acetoxybenzoic, nicotinic, isonicotinic acid and the like, or any other suitable carboxylic acid, as well as organic sulfonic acids, e.g. methane sulfonic, ethane sulfonic, ethane 1,2-disulfonic, 2-hydroxyethane sulfonic, p-toluene sulfonic acid and the like, or any other suitable acid. Salts, which may be prepared primarily for identification purposes, are, for example, those with acidic organic nitro compounds, e.g. picric, picrolonic, flavianic acid and the like, or metal complex acids, e.g. phosphotungstic, phosphomolybdic, chloroplatinic, Reinecke acid and the like. Mono- or poly-salts may be formed, depending on the number of salt-forming groups and/or the conditions used for the salt formation.

Quaternary ammonium compounds of the compounds of this invention may be either mono- or poly-quaternary ammonium compounds, depending on the number of tertiary amino groups present and/or the conditions of the quaternization reaction. Quaternary ammonium compounds are particularly those with lower aliphatic hydrocarbon halides, sulfates or sulfonates, such as lower alkyl halides, e.g. methyl, ethyl, n-propyl or isopropyl chloride, bromide, iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate, or lower alkyl lower hydroxyalkane sulfonates, e.g. methyl 2-hydroxy-ethane sulfonate and the like, or lower alkyl monocyclic carbocyclic aryl sulfonates, e.g. methyl or ethyl p-toluene sulfonate and the like, as well as those with carbocyclic aryl-aliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the salts of such hydroxides with acids, particularly with the organic carboxylic acids mentioned hereinabove.

Also included within the scope of the present invention are the N-oxides of the aforementioned compounds, as well as the acid addition salts of such N-oxides, for example, those with the above-mentioned acids.

The compounds of the present invention have antihistaminic properties and can be used as antihistaminic agents to relieve allergic disorders, such as, for example, hay fever, urticaria, allergies caused by food, plant pollens, medicinal agents and the like. They also show local anesthetic properties and can be used accordingly, for example, in the treatment of burns and similar conditions.

The compounds of this invention also have anthelmintic effects, particularly against tape worms, such as, for example, *Hymenolepsis nana* and the like, and can, therefore, be used as anthelmintic agents in the treatment of worms, particularly tape worm, infections.

Particularly useful are the compounds of the formula

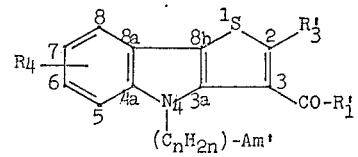

in which $R_1'$ represents lower alkoxy, e.g. methoxy, ethoxy, n-propyloxy, isopropyloxy, n-butyloxy and the like, or amino of the formula —$NR_a'R_b'$, in which each of the groups $R_a'$ and $R_b'$ represents lower alkyl, e.g. methyl, ethyl, n-propyl, isopropyl, n-butyl and the like, and the letter $n$ stands for a whole number from two to seven; whereby the group of the formula —$(C_nH_{2n})$— separates the Am' from the indole nitrogen atom by at least two carbon atoms, Am' represents N,N-di-lower alkyl-amino, e.g. N,N-dimethyl-amino, N-ethyl-N-methyl-amino, N,N-diethylamino, N,N-di-n-propylamino and the like, N,N-alkylene-imino, in which alkylene has from four to seven carbon atoms, e.g. 1-pyrrolidino, 1-piperidino, 1-N,N-(1,6-hexylene)-imino and the like, 4-lower alkyl-1-piperazino, e.g. 4-methyl-1-piperazino, 4-ethyl-1-piperazino and the like, 4-morpholino or 4-thiamorpholino, the group $R_3'$ represents hydrogen or lower alkyl, particularly methyl, and the group $R_4$ represents hydrogen, lower alkyl, e.g. methyl, ethyl, n-propyl, isopropyl, n-butyl and the like, lower alkoxy, e.g. methoxy, ethoxy, n-propyloxy, isopropyloxy, n-butyloxy and the like, halogeno, e.g. fluoro, chloro, bromo and the like, trifluoromethyl and the like, or the pharmacologically acceptable, non-toxic acid addition salts thereof.

The new compounds of this invention may be used in the form of pharmaceutical preparations, which contain the new compounds in admixture with a pharmaceutical organic or inorganic, solid or liquid vehicle suitable for enteral or parenteral administration. For making up the preparations there may be used substances, which do not react with the new compounds, such as water, gelatine, lactose, starches, lactic acid, stearic acid, magnesium stearate, stearyl alcohol, talc, vegetable oils, benzyl alcohols, gums, propylene glycol, polyalkylene glycols, or any other known carrier used for pharmaceutical preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other pharmacologically useful substances.

The compounds of this invention may be prepared according to known methods; for example, they may be obtained by converting in a reactive functional derivative of a 4H-thieno[3,2-b]indole 3-carboxylic acid, particularly in a compound of the formula

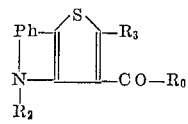

in which Ph, $R_2$ and $R_3$ have the previously-given meaning, and the substituent —CO—$R_0$ stands for a reactive, functionally converted carboxyl group, the reactive, functionally converted carboxyl group —CO—$R_0$ into the desired ester or amido group, and, if desired, converting a resulting salt into the free compound or into another salt, and/or, if desired, converting a resulting compound into a salt, a quaternary ammonium compound, an N-oxide or a salt of an N-oxide thereof.

A reactive, functionally converted carboxyl group of the starting material is, for example, a reactive esterified carboxyl group, such as, for example, a carbo-lower alkoxy group, e.g. carbomethoxy, carbethoxy and the like, or any other reactive esterified carboxyl group, such as, for example, a carboxyl group esterified by tetrahydropyranyl, p-nitro-phenyl, benzyl and the like, or, more particularly, a halogeno-carbonyl, particularly a chlorocarbonyl, or bromocarbonyl, group.

The conversion of the reactive, functionally converted carboxyl group into the desired ester or amido group is carried out according to known methods. For example, a halogeno-carbonyl group may be converted into the lower alkyl ester group by treatment of the starting material having such halogeno-carbonyl group with a lower alkanol, preferably in the presence of a suitable, inert solvent, e.g. ethyl acetate, benzene and the like, and, if necessary, at an elevated temperature in a closed vessel and/or in the atmosphere of an inert gas, e.g. nitrogen and the like. Or, a reactive esterified carboxyl group, which differs from the desired carbo-lower alkoxy group, may be converted into the latter by reacting the starting material having such reactive esterified carboxyl group with a lower alkanol in the presence of a suitable transesterification reagent, such as, for example, an alkali metal, e.g. sodium potassium and the like, compound of the lower alkanol, or any other suitable transesterification reagent, e.g. benzyl trimethyl ammonium hydroxide, potassium cyanide and the like. If necessary, an additional inert solvent may be present, and the reaction may be carried out at an elevated temperature, in a closed vessel, and/or, in the atmosphere of an inert gas, e.g. nitrogen and the like.

A desired unsubstituted amido group may be introduced, for example, by treating the starting material having a halogeno-carbonyl group with ammonia or an ammonia-furnishing reagent, e.g. ammonium hydroxide, hexamethylene tetramine, an alkali metal, e.g. sodium, and the like, amide, or any other suitable reagent, whereas an N-alkyl substituted amido group is introduced by treating such starting material with an N-alkyl-substituted amine, such as an N-lower alkyl-amine, e.g. N-methyl-amine, N-ethyl-amine, N-n-propylamine, N-isopropyl-amine, N-n-butyl-amine and the like, or an N,N-di-lower alkyl-amine, e.g. N,N-dimethylamine, N,N-diethylamine, N,N-di-n-propylamine, N,N-di-isopropylamine, N,N-n-butylamine and the like. The reaction may be carried out in the absence or in the presence of a solvent, such as benzene and the like, if necessary, while cooling or heating, in a closed vessel and/or in the atmosphere of an inert gas, e.g. nitrogen and the like. Or, a reactive esterified carboxyl group may be converted into the desired unsubstituted amido group, for example, by treatment of the starting material having such reactive esterified carboxyl group with ammonia or an ammonia-furnishing reagent or with a suitable amine, if necessary, in the presence of a solvent, at an elevated temperature, in a closed vessel, and/or in the atmosphere of an inert gas, e.g. nitrogen and the like.

The starting materials used in the above procedure are known or may be prepared according to known methods as, for example, described by Benary et al., Ber., vol. 48, p. 593 (1915).

The compounds of this invention may also be prepared, for example, by reacting an N-monocyclic carbocyclic aryl-N-$R_2$-hydrazine, such as a hydrazine compound of the formula

in which Ph and $R_2$ have the previously-given meaning, with a 2,3-dihydro-thiophen-3-one, such as a ketone compound of the formula

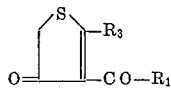

in which $R_1$ and $R_3$ have the previously-given meaning, or the enol derivative thereof, and, if necessary, eliminating ammonia from a resulting hydrazone compound of the formula

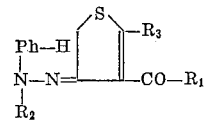

in which Ph, $R_1$, $R_2$ and $R_3$ have the previously-given meaning, by treatment with a Lewis acid, and, if desired, carrying out the optional steps.

The above reaction is preferably carried out according to the Fischer indole synthesis, i.e. hydrazone formation and ring-closure are carried out simultaneously. This one-step procedure may be performed, for example, by treating a mixture of the hydrazine compound and theinone compound with a suitable Lewis acid reagent, such as zinic chloride, cuprous chloride, boron trifluoride etherate, dilute sulfuric acid, ethanolic hydrogen chloride, glacial acetic acid, a mixture of acetic and hydrochloric acid and the like, preferably at an elevated temperature, and, if necessary, in the presence of a diluent, e.g. methanol and the like, and/or in a closed vessel, and/or in the atmosphere of an inert gas, e.g. nitrogen and the like. The two steps, i.e. hydrazone formation and ring-closure, may also be carried out step-wise, using a suitable inert solvent for the hydrazone formation, and treating the latter with the Lewis acid.

The starting materials are known or may be prepared according to the procedure used for the preparation of known analogs.

The compounds of this invention may also be prepared by replacing in a compound of the formula

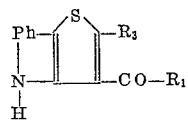

in which Ph, $R_1$ and $R_3$ have the previously-given meaning, or a metal salt thereof, the hydrogen atom attached to the indole-nitrogen atom by the group $R_2$, and, if desired, carrying out the optional steps.

Replacement of the hydrogen atom attached to the indole-nitrogen atom is carried out according to known methods. For example, the N-unsubstituted 4H-thieno-[3,2-b]indole 3-carboxylic acid ester or amide compound is converted into a metal, particularly an alkali metal, e.g. lithium, sodium, potassium and the like, derivative thereof, and the latter is then treated with the reactive ester of a tertiary amino-lower alkanol. The metal, particularly alkali metal, derivative may be prepared by treating the N-unsubstituted 4H-thieno[3,2-b]indole 3-carboxylic acid ester or amide with an alkali metal, e.g. sodium, potassium and the like, or an alkali metal hydride or amide, e.g. sodium or potassium hydride or amide, with any other known reagent, preferably in the presence of a suitable inert solvent. The reactive ester of a tertiary amino-lower alkanol, particularly of a compound of the formula HO—($C_nH_{2n}$)—Am, in which the letter $n$ and the groups —($C_nH_{2n}$)— and Am have the previously-given meaning, which is reacted with the metal derivative of the N-unsubstituted 4H-thieno[3,2-b]indole compound, is particularly a tertiary amino-lower alkyl halide, e.g. chloride, bromide and the like (which represents the reactive ester of a tertiary amino-lower alkanol with a hydrohalic, e.g. hydrochloric, hydrobromic acid and the like), as well as a tertiary amino-lower alkyl sulfonate, e.g. methane sulfonate, p-toluene sulfonate and the like (which represents the reactive ester of a tertiary amino-lower alkanol with an organic sulfonic acid, e.g. methane sulfonic, p-toluene sulfonic acid and the like). The reaction is carried out in the presence of an inert solvent, preferably the solvent used during the preparation of the metal compound, if necessary, while cooling or heating, in a closed vessel, and/or in the atmosphere of an inert gas, e.g. nitrogen and the like. This method may also be employed for the preparation of starting materials used in the above-mentioned procedure, in which the reactive, functionally converted carboxyl group of an N-substituted thieno[3,2-b]indole 3-carboxylic acid is converted into the desired esterified carboxyl or amido group.

The compounds of this invention may be obtained in the form of the free bases or as the salts thereof. A salt may be converted into the free base, for example, by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, or any other suitable alkaline reagent, as well as an anion exchange resin and the like. A free base may be converted into its acid addition salts by reacting the former with one of the organic acids mentioned hereinbefore. The salt-forming reaction may be carried out, for example, by treating a solution of the free base in an inert solvent, or in a solvent mixture with the acid or a solution thereof and isolating the desired salt. A resulting salt may be converted into another salt, for example, by treating it with a metal, such as alkali metal, e.g. sodium, potassium and the like, salt of an acid, in the presence of a suitable solvent. Salts may be obtained as hemihydrates, monohydrates, sesquihydrates or polyhydrates, depending on the conditions used in the formation of the salts.

N-oxides of the compounds of the present invention may be prepared according to known methods, for example, by treating a solution of the resulting compound, containing a tertiary nitrogen atom or a salt thereof in a suitable inert solvent, with an N-oxidizing reagent, such as, for example, ozone, hydrogen peroxide, an inorganic peracid, e.g. persulfuric acid and the like, an organic persulfonic acid, e.g. p-toluene persulfonic acid and the like, or primarily an organic percarboxylic acid, e.g. peracetic acid, perbenzoic acid, monoperphthalic acid and the like. The N-oxides may be obtained in the form of the free bases or the acid addition salts thereof; N-oxide free bases may be converted into their acid addition salts or the salts may be converted into the free N-oxide bases according to the previously-described procedures. Mono- or poly-N-oxides may be obtained, depending on the number of tertiary amino groups present.

The quaternary ammonium compounds of the compounds of this invention may be obtained, for example, by reacting the tertiary base with an ester formed by a hydroxylated compound and a strong inorganic or organic acid, such as a mineral acid, e.g. hydrochloric, hydrobromic, hydriodic, sulfuric acid and the like, or a strong organic acid, such as a lower alkane sulfonic acid, e.g. methane sulfonic, ethane sulfonic acid and the like, hydroxy-lower alkane sulfonic acid, e.g. 2-hydroxy-ethane sulfonic acid and the like, a monocyclic carbocyclic aryl sulfonic acid, e.g. p-toluene sulfonic acid and the like. Reactive esters are, for example, lower alkyl halides, e.g. methyl, ethyl, n-propyl or isopropyl chloride, bromide, iodide and the like, phenyl-lower alkyl halides, e.g. benzyl, 1-phenylethyl or 2-phenylethyl chloride, bromide or iodide and the like, lower alkyl-lower alkane sulfonates, e.g. methyl methane sulfonate, methyl ethane sulfonate, ethyl methane sulfonate, ethyl ethane sulfonate and the like, lower alkane hydroxy-lower alkane sulfonate, e.g. methyl-2-hydroxy-ethane sulfonate, ethyl 2-hydroxy-ethane sulfonate and the like, or lower alkyl monocyclic carbocyclic aryl sulfonate, e.g. methyl p-toluene sulfonate and the like. The quaternizing reactions may be performed in the absence or presence of an inert solvent, if necessary, while cooling or heating, in a closed vessel, and/or in the atmosphere of an inert gas, e.g. nitrogen and the like.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium hydroxide there may be obtained quaternary ammonium salts by reacting the base with acids, for example, those used for the preparation of acid addition salts. A quaternary ammonium compound may also be converted directly into another quaternary ammonium salt without the formation of an intermediate quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be isolated as hydrates; depending on the number of tertiary amino groups present in the molecule and/or the conditions for their formation, mono- or poly-quaternary ammonium compounds may be formed.

The invention also comprises any modification of the process, wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a suspension of 5.2 g. of 3-carbethoxy-2-methyl-4H-thieno[3,2-b]indole in 35 ml. of toluene is added 1.45 g. of a 55 percent suspension of sodium amide in toluene. The reaction mixture is refluxed for 3½ hours, then cooled to room temperature and treated with a solution of 2.6 g. of 3-N,N-dimethylaminopropyl chloride in 20 ml. of toluene. The reaction mixture is again refluxed for three hours, while stirring, and is then cooled to room temperature. The insoluble material is filtered off, the filtrate is evaporated to dryness, and the residue is dissolved in toluene. A saturated solution of hydrogen chloride in anhydrous ethanol is added and 4.95 g. of the 3-carbethoxy-4-(3-N,N-dimethylaminopropyl) - 2 - methyl-thieno[3,2-b]indole hydrochloride of the formula

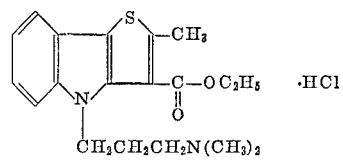

is recovered, which is recrystallized from a mixture of isopropanol and diethylether, M.P. 200–203°.

Other compounds which may be prepared according to the above procedure are, for example, 3-carbethoxy-4-(2-N,N-dimethylamino-2-methyl - ethyl)-2-methyl-thieno[3,2-b]indole hydrochloride, M.P. 257–259° (after recrystallization from isopropanol);
3-carbethoxy-4-(2-N,N-diethylaminoethyl) - 2 - methyl-thieno[3,2-b]indole hydrochloride, M.P. 187–188° (after recrystallization from isopropanol);

3-carbethoxy-7-chloro-4-(2 - N,N - diethylaminoethyl)-2-methyl-thieno[3,2-b]indole hydrochloride, M.P. 224–227° (with decomposition, after recrystallization from isopropanol);

3 - carbethoxy-7-chloro-4-(2-N,N-dimethylamino-2-methyl-ethyl)-2-methyl-thieno[3,2 - b]indole hydrochloride, M.P. 200–205° (after recrystallization from a mixture of isopropanol and diethylether);

3-carbethoxy-7-chloro - 4 - (3 - N,N - dimethylaminopropyl)-2-methyl-thieno[3,2 - b]indole hydrochloride, M.P. 215–217° (after recrystallization from isopropanol);

as well as 7-bromo-3-carbomethoxy-4-[2-(4-methyl-piperazino)-ethyl]-thieno[3,2-b]indole, 3 - carboisopropoxy-7-methoxy-2-methyl - 4 - [2 - (4 - morpholino)-ethyl]-thieno[3,2-b]indole, 3-carbethoxy-2,7-dimethyl-4-[2-(1-pyrrolidino)-ethyl]thieno[3,2-b]indole and the like.

*Example 2*

A solution of 2.67 g. of 3-carbethoxy-4-(3-N,N-dimethylaminopropyl)-2-methyl-thieno[3,2 - b]indole (obtained from the corresponding hydrochloride of Example 1 by treatment with a base) in 15 ml. of methanol is cooled in an ice-bath and 2.8 g. of methyl chloride is added. The reaction mixture is heated in a sealed tube for 1½ hours to 90°; the solvent is evaporated, whereupon the 3-carbethoxy-4-(3-N,N-dimethylaminoethyl)-2-methyl-thieno[3,2-b]indole methochloride of the formula

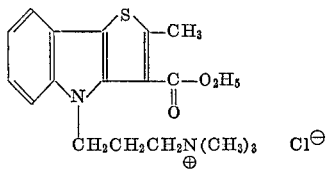

crystallizes; it melts at 194° (with decomposition after recrystallization from a mixture of isopropanol and diethyl ether).

*Example 3*

A mixture of 10 g. of 3-N,N-diethylcarboxamido-2-methyl-4H-thieno[3,2-b]indole in 70 ml. of toluene and 2.48 g. of a 55 percent suspension of sodium amide in toluene is refluxed for four hours and then treated with 5.64 g. of 2-(1-piperidino)-ethyl chloride in 30 ml. of toluene. After refluxing for several hours, the reaction mixture is worked up as shown in Example 1 to yield the desired 3 - N,N - diethylcarboxamido-2-methyl-4-[2-(1-piperidino)-ethyl]-thieno[3,2-b]indole hydrochloride of the formula

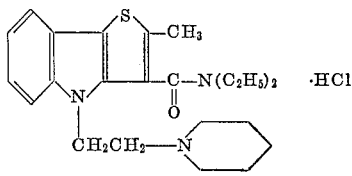

which melts at 194–198° after recrystallization from a mixture of isopropanol and diethyl ether.

Other compounds which may be prepared according to the above procedure are, for example, 3-N,N-diethylcarboxamido-4-(3 - N,N - dimethylaminopropyl)-2-methyl-thieno[3,2 - b]indole hydrochloride, M.P. 169–171°;

3-N,N-diethylcarboxamido-4-(2 - N,N - dimethylamino-2-methyl-ethyl)-2-methyl-thieno[3,2 - b]indole hydrochloride, M.P. 194–198°;

3-N,N-dimethylcarboxamido - 2 - methyl-4-[2-(1-piperidino)-ethyl]-thieno[3,2-b]indole hydrochloride, M.P. 240–243°;

4-(3-N,N-dimethylaminopropyl) - 3 - N,N-dimethylcarboxamido-2-methyl-thieno[3,2-b]indole hydrochloride, M.P. 209–212°;

4-(2-N,N-dimethylamino-2-methyl-ethyl) - 3 - N,N - dimethylcarboxamido-2-methyl-thieno[3,2 - b]indole hydrochloride, M.P. 234–238°;

as well as 7-chloro-3-N-methylcarboxamido-4-[2-(4-methyl - piperazino) - ethyl]thieno[3,2 - b]indole, 7-bromo-4-(2-N,N-dimethylaminoethyl)-3-N,N - di - isopropylcarboxamido - thieno[3,2 - b]indole, 3-carboxamido-7-methoxy-2-methyl - 4 - [2 - (4 - morpholino)-ethyl]-thieno[3,2-b]indole, 3-N,N-diethylcarboxamido-2,7-dimethyl-4-[2-(1 - pyrrolidino) - ethyl] - thieno-[3,2-b]indole and the like.

The starting materials used in the above example may be prepared as follows: A mixture of 60 g. of 3-carboxy-2-methyl-4H-thieno[3,2-b]indole, 60 ml. of thionyl chloride and 600 ml. of toluene is heated to reflux for one hour. After cooling, the crystalline 3-chlorocarbonyl-2-methyl-4H-thieno[3,2-b]indole precipitates and is filtered off, M.P. 152–154°.

To a solution of 30 g. of 3-chlorocarbonyl-2-methyl-4H-thieno[3,2-b]indole in 500 ml. of benzene is added a solution of 18 ml. of N,N-dimethylamine in 20 ml. of diethylether. The crystalline precipitate is filtered off, washed with water and recrystallized from methanol to yield 25.6 g. of 3-N,N-dimethylcarboxamido-2-methyl-4H-thieno[3,2-b]indole, M.P. 263–265°.

In the above preparation of the amide, N,N-dimethylamine may be replaced by N,N-diethylamine; the resulting 3-N,N-diethylcarboxamido - 2 - methyl-4H-thieno[3,2-b]indole melts at 202–204°.

What is claimed is:

1. A member selected from the group consisting of a compound of the formula

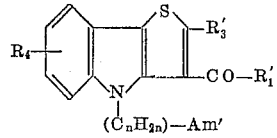

in which $R_1'$ represents a member selected from the group consisting of lower alkoxy and N,N-di-lower alkyl-amino, the letter $n$ represents a whole number from two to seven, the group of the formula —$(C_nH_{2n})$— separates $Am'$ from the indole-nitrogen by at least two carbon atoms, $Am'$ represents a member selected from the group consisting of N,N-di-lower alkyl-amino, N,N-alkylene-imino, in which alkylene has from four to seven carbon atoms, 4-lower alkyl-piperazino, and 4-morpholino, $R_3'$ represents a member selected from the group consisting of hydrogen and lower alkyl, and $R_4$ stands for a member selected from the group consisting of hydrogen, lower alkyl, lower alkoxy, and halogen, the pharmacologically acceptable, non-toxic acid addition salts thereof, and the lower alkyl quaternary ammonium compounds thereof.

2. A compound of the formula

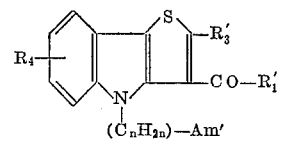

in which $R_1'$ is lower alkoxy, the letter $n$ represents a whole number from two to seven, the group of the formula —$(C_nH_{2n})$— separates $Am'$ from the indole-nitrogen by at least two carbon atoms, $Am'$ is N,N-di-lower alkyl-amino, $R_3'$ is lower alkyl, and $R_4$ stands for hydrogen.

3. 3 - carbethoxy - 4 - (3 - N,N - dimethylaminopropyl)-2-methyl-thieno[3,2-b]indole.

4. 3 - carbethoxy - 4 - (2 - N,N - dimethylamino - 2-methyl-ethyl)-2-methyl-thieno[3,2-b]indole.

5. 3 - carbethoxy - 4 -( 2 - N,N - diethylaminoethyl)-2-methyl-thieno[3,2-b]indole.

6. 3 - carbethoxy - 7 - chloro - 4 - (2 - N,N - diethylaminoethyl)-2-methyl-thieno[3,2-b]indole.

7. 3 - carbethoxy - 7 - chloro - 4 - (2 - N,N - dimethylamino-2-methyl-ethyl)-2-methyl-thieno[3,2-b]indole.

8. 3 - carbethoxy - 7 - chloro - 4 - (3 - N,N - dimethylaminopropyl)-2-methyl-thieno[3,2-b]indole.

9. 3 - N,N - diethylcarboxamido - 2 - methyl - 4- [2-(1-piperidino)-ethyl]-thieno[3,2-b]indole.

10. 3 - N,N - diethylcarboxamido - 4 - (3 - N,N - dimethylaminopropyl)-2-methyl-thieno[3,2-b]indole.

11. 3 - N,N - diethylcarboxamido - 4 - (2 - N,N - dimethylamino - 2 - methyl - ethyl) - 2 - methyl - thieno-[3,2-b]-indole.

12. 3 - N,N - dimethylcarboxamido - 2 - methyl - 4- [2-(1-piperidino)-ethyl]-thieno[3,2-b]indole.

13. 4 - (3 - N,N - dimethylaminopropyl) - 3 - N,N-dimethylcarboxamindo-2-methyl-thieno[3,2-b]indole.

14. 4 - (2 - N,N - dimethylamino - 2 - methyl - ethyl)-3 - N,N - dimethylcarboxamido - 2 - methyl - thieno[3,2-b]indole.

No references cited.

UNITED STATES PATENT OFFICE
CERTIFICATE OF CORRECTION

Patent No. 3,133,930  May 19, 1964

Lincoln Harvey Werner

It is hereby certified that error appears in the above numbered patent requiring correction and that the said Letters Patent should read as corrected below.

Column 10, line 55, for "halogen" read -- halogeno --; column 12, line 7, for "dimethylcarboxamindo" read -- dimethylcarboxamido --.

Signed and sealed this 15th day of September 1964.

(SEAL)
Attest:

ERNEST W. SWIDER
Attesting Officer

EDWARD J. BRENNER
Commissioner of Patents